United States Patent Office 3,503,687
Patented Mar. 31, 1970

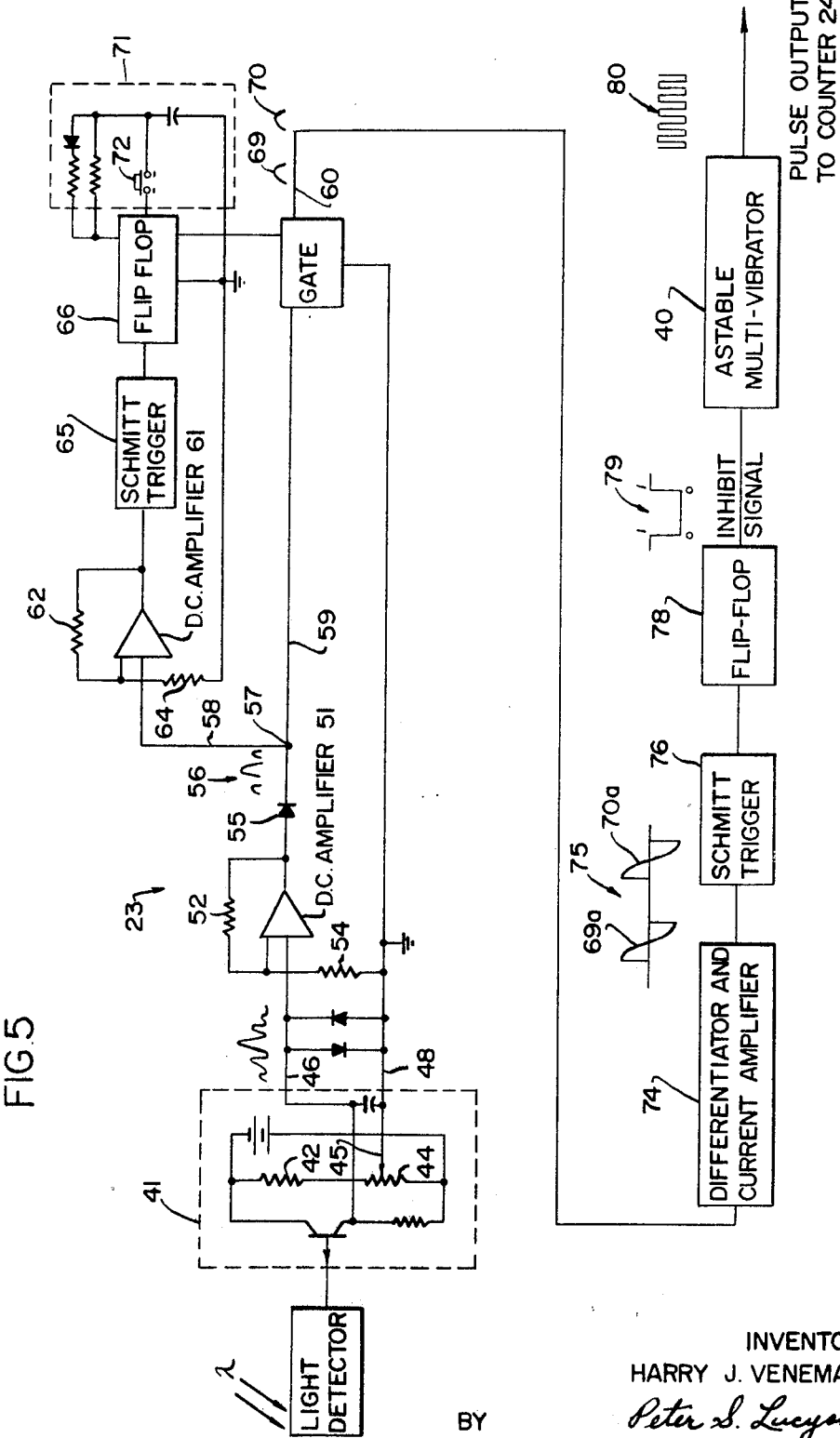

3,503,687
SYSTEM USING A LASER BEAM FOR ANALYZING AN UNKNOWN APERTURE
Harry J. Venema, Wheaton, Ill., assignor to Borg-Warner Corporation, Chicago, Ill., a corporation of Illinois
Filed May 1, 1967, Ser. No. 634,991
Int. Cl. G01b 9/02
U.S. Cl. 356—106                      2 Claims

ABSTRACT OF THE DISCLOSURE

A laser beam measurement system in which a laser beam is directed at an unknown aperture in a spinnerette to effect a far-field diffraction pattern a predetermined distance beyond the aperture, a rotating mirror being located to intercept the diffraction pattern and transmit signals representative of the radiation intensity variation in the diffraction pattern to a readout circuit calibrated to feed signals to a legible indicator whereby the geometrical characteristics, for example, the diameter of the unknown aperture, are displayed.

BRIEF SUMMARY OF THE INVENTION

The present invention is in a system for determining the geometrical characteristics of an unknown aperture including a laser beam directed at the unknown aperture defined by an opaque wall-like surface held so that the aperture is in the path of the laser beam, thereby effecting a far-field diffraction pattern beyond the aperture, with a photodetector disposed a predetermined distance beyond the aperture and being responsive to the variations in the radiation intensity of the pattern to produce a signal which is received by a predetermined circuit adapted to translate the signal into information usable by an information storage means, for example, a counter, to legibly display the geometrical characteristics.

Far-field or interference diffraction patterns produced by directing monochromatic radiation through a small aperture have been known for many years. The radiation or light source is located on one side of the aperture and is aimed so as to direct a beam along an axis through the aperture. Mathematical analysis of the diffraction pattern established in a plane-screen perpendicular to the axis is simplified if the selected plane is at a sufficient distance from the aperture so that certain assumptions can be made.

The formula for intensity as presented by Fraunhofer for the far-field diffraction pattern in which the higher order terms are neglected is as follows:

$$I(P) = \left[\frac{2J_1(kaw)}{kaw}\right]^2 I_o$$

Identifying the terms of the latter formula: $J_1$ is a first order Bessel function; $k$ is the propagation constant $2\pi/\lambda$ where $\lambda$ is the wave length of the electromagnetic radiation; $a$ represents the aperture radius; $w$ is a form of the direction cosine of the radiation which can be represented by $\sin \theta$ where $\theta$ is the angle subtended between a point in the diffraction pattern on the plane-screen and the perpendicular axis passing through the aperture and plane. This equation is developed in a book entitled "The Principle of Optics" authored by Born and Wolf and published by MacMillan Company, copyright 1964 (see chapter VIII).

The formula was first derived in a somewhat different form for a circle by G. B. Airy, and the diffraction pattern for a circular aperture displaying the central high intensity spot and alternate rings of low and high intensity bears his name, i.e. the Airy pattern.

The nulls or low intensity points of the equation $$I(P) = \left[\frac{2J_1(kaw)}{kaw}\right]^2 I_o$$

may be solved for by setting $kaw$ equal to 3.832; 7.016; 10.174; etc. (see pages 396, 397 of the above mentioned publication). The formula for the first null may be derived:

$$\sin \theta = \frac{3.8\lambda}{2\pi a}$$

where $\theta$ is the angle subtended between the perpendicular axis and a line from the aperture to the first Airy ring, where $\lambda$ is the wave length of the radiation, and where $a$ is the radius of the aperture. The maxima for the equation $$I(P) = \left[\frac{J(kaw)}{kaw}\right]^2 I_o$$

may be derived by setting $kaw$ equal to 5.136; 8.417; 11.620; etc. (again, see pages 396, 397 of the above publication). For the first maxima or high intensity ring the equation is derived:

$$\sin \theta = \frac{5.1\lambda}{2\pi a}$$

It is also known to utilize the diffraction pattern to test the responsiveness of instrumentation to an optical field. To this end see "Instrumentation for Spatial Measurements of Optical Fields," Report 236 by Herman M. Heinemann; Wheeler Laboratories; Smithtown, N.Y. However, there is no appreciation in the known prior art of the present unique arrangement of means and present method of legibly and accurately determining and defining the geometric characteristics of an unknown opening.

Accordingly, it is an object of the present invention to provide a system for measuring the geometric characteristics of an unknown small aperture by positioning the aperture between a source of coherent, monochromatic electromagnetic radiation, such as a laser beam, and a far-field plane, and then using radiation responsive means to "read" the far-field diffraction pattern which is then converted to legible information indicating size and shape of the unknown aperture.

It is a more detailed object of the present invention to provide a system for measuring the geometric characteristics of an unknown small aperture in accordance with the above and including an electronic readout means to convert the diffraction pattern data into legible dimension and shape information.

It is an overall object of the present invention to provide a system for rapid inspection of unknown small apertures to permit quick identification of the size and shape of these apertures. Along this line, the present invention allows more accurate analysis, within a selected period of time, of a series of unknown apertures than has heretofore been possible using presently known instrumentation.

Other objects and advantages of the invention will become apparent upon reading the following description and upon which:

FIGURE 5 is a block diagram of an exemplary readout circuit responsive to the photo or radiation detector in FIGURE 4.

Figure 1:
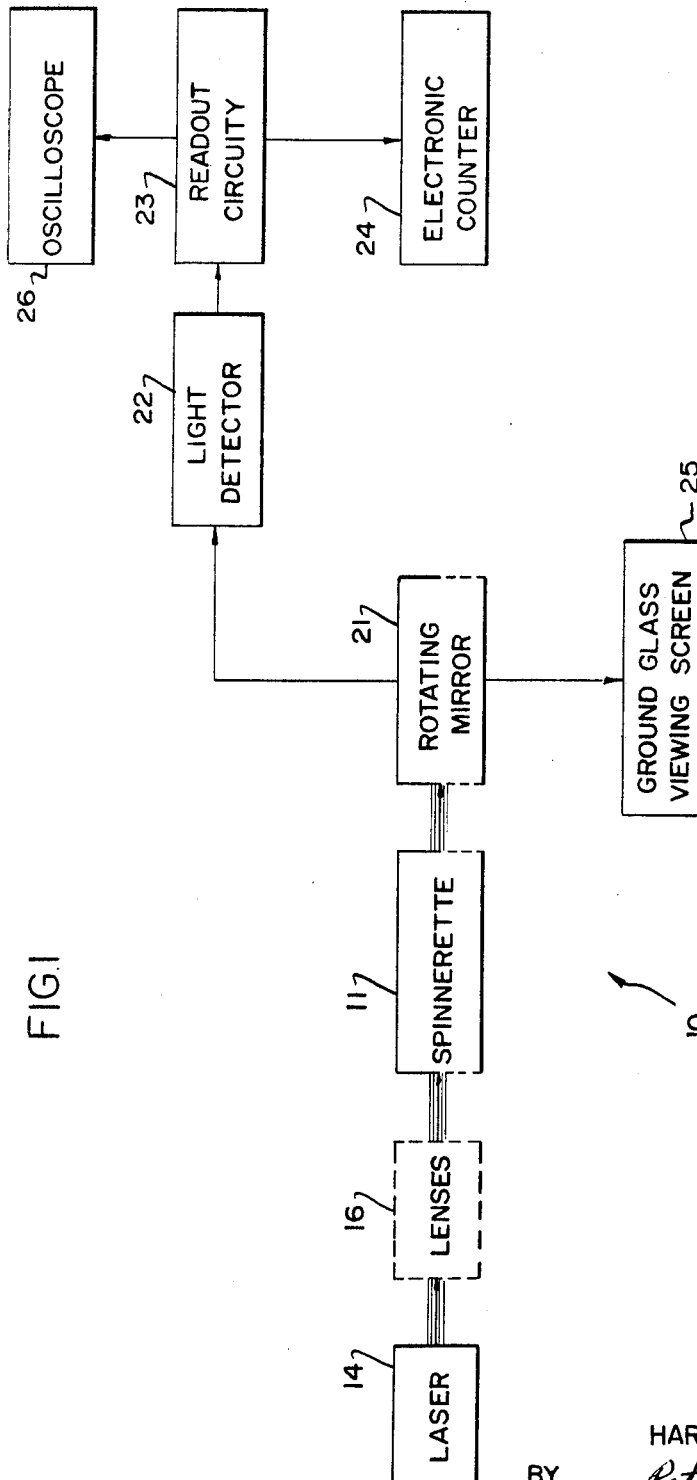
FIGURE 1 is a block diagram of a microaperture measuring system embodying the present invention.
Figure 2:
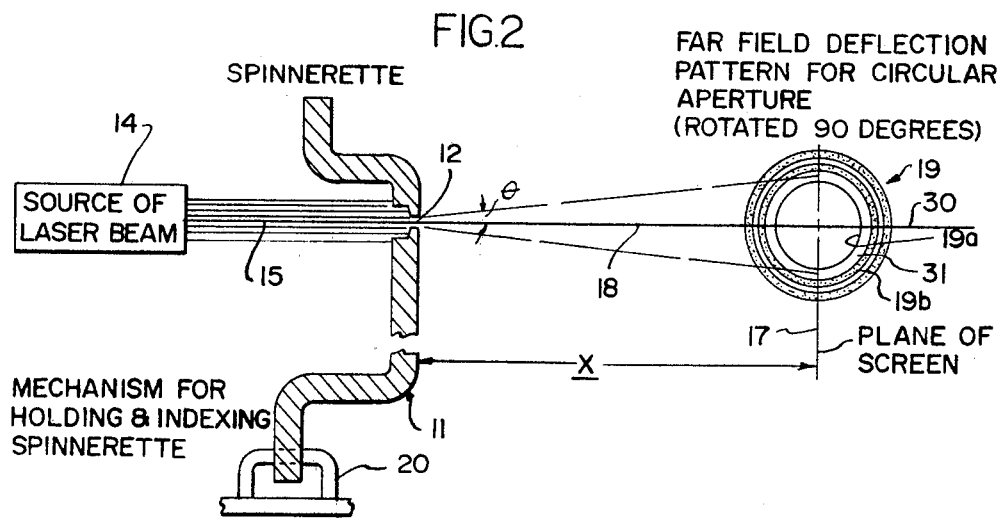
FIGURE 2 is an elevation of a spinnerette, one aperture of which is positioned in the path of a laser beam.

Turning to the drawings and the preferred embodiment shown in FIGURE 1, there presented is a microaperture measuring system 10. The system 10 is used, in the present instance, to measure a series of apertures or openings in a spinnerette 11. The latter is utilized in forming threads from filaments of synthetic materials. The spinnerette head 11 as shown in cross-section in FIGURE 2 is generally cup-shaped, and includes an aperture 12, one of a series of apertures disposed in a wall 11a of the spinnerette. The geometric characteristics, that is the shape and/or size of the series of apertures must be maintained within predetermined tolerances. Extreme accuracy must be held in the size and shape of the apertures to assure that filaments formed by the apertures meet specifications. Heretofore, electron microscopes and optical microscopes have been used to accurately measure small apertures having geometric characteristics such as those of aperture 12. This is a slow, tedious and inaccurate operation.

In accordance with the present invention a laser beam is directed so as to impinge on an unknown small aperture and a far-field diffraction pattern is read electronically and then converted to legible information to indicate the size and shape of the unknown aperture. As herein illustrated, a laser source 14 is spaced from opening 12 and generates a laser beam 15 which is exemplarily passed through a lens arrangement 16 in order to collimate the beam prior to impingement upon the spinnerette aperture 12. In many applications no collimation is needed. The wall 11a is opaque and prevents passage of the laser beam, so that only the beam portion which impinges the aperture has an effect beyond the wall 11a. At a predetermined distance X beyond the aperture 12, a projection screen may be disposed in a plane 17, the latter being perpendicular to a beam axis 18. A far-field diffraction pattern 19, as generally shown in FIGURE 2, is established on the plane-screen 17. To permit graphic display of the diffraction pattern in the drawings, the plane-screen 17 is shown rotated 90 degrees toward the observer. Because the distance X is critical and because the spinnerette 12 must be moved to bring each of the apertures into the path of the laser beam, the spinnerette 11 is supported on a suitable holding and indexing mechanism 20, herein generally represented. The latter may take the form of a micro-manipulator which permits the necessary minute adjustments.

Figure 4:
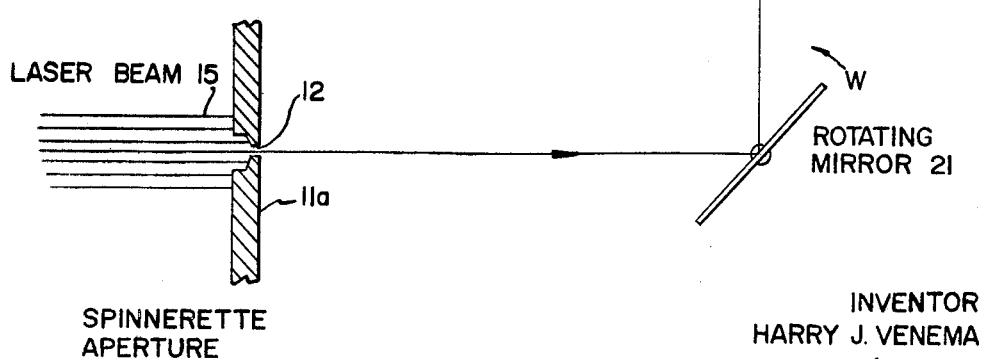
FIGURE 4 is a diagramatic representation of structure for sensing the intensity pattern shown in FIGURE 3.

As illustratively shown, the diffraction pattern is presented to a rotating mirror 21 positioned to sense or intercept the pattern established in the plane-screen 17. As best shown in FIGURE 4, the diffraction pattern 19 is transmitted by the rotating mirror 21 to a photo or light detector 22 which responds to the variations in radiation intensity. As is described in detail subsequently, the rotating mirror provides the necessary relative movement between the radiation detector 22 and the diffraction pattern 19 so that the image patterns at the plane-screen 17 can be analyzed or mapped. The data from the radiation detector is processed to give the geometric characteristics of the unknown aperture.

Figure 3:
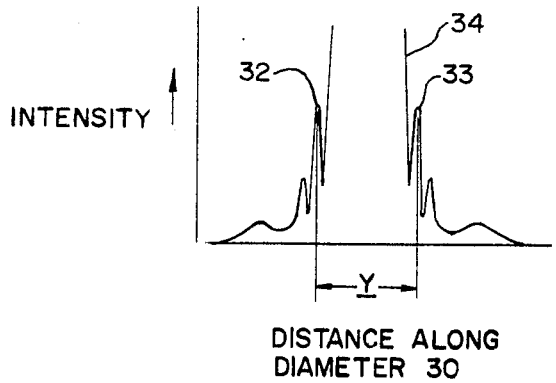
FIGURE 3 is a plot of radiation intensity versus distance along a diameter of the far-field diffraction pattern shown in FIGURE 2.

The electrical output of the radiation detector 22 is fed into a readout circuit 23 (shown in block diagram in FIGURE 5) and the output of the latter is fed into an electronic counter 24 which is preferably adapted to legibly represent the geometrical characteristics, for example, the radius or shape of the unknown aperture 12. There is shown in FIGURE 1 a ground glass viewing screen 25 which is capable of receiving the radiation or light intensity pattern from the rotating mirror and of representing the pattern visually. This permits photographs to be made of the diffraction or interference pattern, and allows visual inspection of the pattern to determine whether the aperture 12 is generally of desired geometric configuration. For example, a round aperture which is partially blocked or improperly shaped displays a diffraction pattern which is clearly distinguishable from pattern 19 representative of a substantially circular shaped aperture. An oscilloscope 26 is shown connected to the readout circuit 23, and can be adapted to display a radiation intensity pattern substantially as shown in FIGURE 3.

Describing the measuring apparatus in more detail, the system is especially adapted for measuring small apertures. Good resolution in the diffraction pattern 19, that is apparent distinctness of diffraction rings such as 19a, 19b, is obtained if the wave length λ of the laser beam 15 as compared to the aperture diameter is selected to have generally a ratio of greater than 1 to 10. In one practical instance a helium-neon gas laser producing a beam having a wave length of .6328 micron was successfully used to measure an aperture of approximately 30 microns. Also, the portion of the laser beam which impinges aperture 12 is preferably of substantially uniform intensity to present a distinct diffraction pattern.

The diffraction pattern 19 exemplarily shown is for a substantially circular aperture 12. As herein stated, this pattern is generally identified as the Airy pattern. The radiation intensity shown in FIGURE 2 is plotted in FIGURE 3 as a function of position along a diameter 30 of the diffraction pattern 19. The first radiation intensity ring 31 (a diffraction pattern maxima), the boundaries of which are defined by the inside dark ring 19a (a diffraction pattern minima), and the outside dark ring 19b (another diffraction pattern minima), is represented in FIGURE 3 by a pair of radiation intensity pulses 32, 33, respectively. There is a center pulse 34, which is only fragmentarily shown because, as explained subsequently, in processing the output of the detector 22 that signal is suppressed by the exemplary readout circuitry 23.

A distance Y between respective pulses 32, 33 corresponds to the diameter of the first radiation intensity ring 30 in the plane, X distance from the aperture. The radius $a$ of the unknown circular aperture is related to the first high intensity or diffraction pattern maxima ring by the following formula:

$$\sin \theta = \frac{5.1\lambda}{2\pi a}$$

which has been described previously. The angle "$\theta$" is shown in FIGURE 2. As is clear therefrom, "$\sin \theta$" can be simply solved for, once the diameter of the diffraction pattern is obtained. Explaining, the radius of the first high intensity ring can be calculated from its diameter Y and the distance X and therewith an angle $\theta$ can be determined. The value of the sine of $\theta$ along with the wave length of the laser beam can be substituted into the formula, and the radius of the aperture can be determined.

To effect a measurement of the diameter of the first radiation intensity ring the present arrangement includes the rotating mirror 21, the radiation detector 22 and the readout circuit 23. Suitable mechanism, such as a small synchronous motor (not shown), is provided to rotate mirror 21 at a fixed angular velocity ω so that, with a particular diameter radiation intensity ring 30, represented by pulses 32, 33, respectively, a predetermined period of time is required for the photo detector 22 to provide an output representing first, pulse 32, and then subsequently pulse 33. Because the diameter of the diffraction pattern first ring 30 is also dependent upon the distance X between the opaque wall-like member 11a and the plane-screen 17, the micro-manipulator must be adjusted to set this distance at a value for which the readout circuit 23 is calibrated.

Introducing the preferred construction of the readout circuit 23 and also the operation thereof, the latter feeds out a train of pulses upon receiving the light detector signal 32 and stops producing pulses upon receiving the light detector signal 33. The interim train of pulses is the information which in the exemplary embodiment is fed into the counter 24. Explaining the utilization of the information in the present instance, with a constant, known pulse output from the readout circuit, the number of pulses counted can be converted into a period of time. The distance is equal to velocity multiplied by time, and with the velocity of mirror 21 being constant, the above solution for the time period multiplied by the velocity gives the solution for the distance Y. The latter, of course, is the diameter of the first radiation intensity ring 30 in the plane 17, X distance from the aperture.

Describing the readout circuit 23 in detail (see FIGURE 5), a train of pulses are produced by an oscillator, here shown as a multivibrator 40. For turning the oscillator 40 "on" and "off," the pulses 32, 33, 34, respectively, of light detector 21 are first fed into a high input impedance stage, exemplarily shown as a Field-Effect-Transistor (FET) source follower stage 41. The high impedance is necessary because a light detector requires a high impedance load. The signal from the light or radiation detector includes a D.-C. component, a bias component and an alternating component, the latter corresponding substantially to the light intensity plot in FIGURE 3. By providing in the circuit 41 resistors 42, 44, the latter having a slider 45, the D.-C. bias component can be removed. To this end the slider 45 is adjusted so that the output of stage 41, applied across a pair of conductors 46, 48, respectively, is substantially "zero" when there is no radiation received by detector 21.

To prevent input of an excessive signal to the succeeding stages, the illustrative circuit includes a pair of diodes 49, 50, respectively, coupled across the conductors 46, 48, to conduct in both directions. The diodes as herein connected appear as open circuits for small signals, that is signals of approximately one-half volt or less in either direction. However, signals greater than about one-half volt in either direction are short circuited by the diodes. Accordingly, the input from stage 41 is clamped to a range of about one volt.

The signal across conductors 46, 48, respectively, is fed into a D.-C. operational amplifier 51, which includes as a part of its circuit a pair of resistors 52, 54, respectively, selected to give a predetermined gain to the D.-C. amplifier 51. The ratio of resistor 52 to resistor 54 fixes the gain of the D.-C. amplifier. The output of the amplifier 51 is fed to a diode 55, which is a low voltage level clipper and serves to cut off the lower voltages while permitting the pulse signal, as diagramatically represented at 56, to proceed to a junction 57.

To suppress the signal representative of the central diffraction pattern pulse 34, the signal at junction 57 is processed along both a path 58 and a path 59 before reaching output conductor 60. Describing this portion of circuit 23, the signal proceeding along path 58 is amplified by a D.-C. operational amplifier 61 including in its circuit, gain determining resistors 62, 64, respectively. The amplifier 61 is of the same type and operation as amplifier 51. The resistors 62, 64, also function as gain selectors for the D.-C. amplifier, as do the previously noted resistors 52, 54. The D.-C. amplifier 61 is a sense amplifier which responds when the signal at junction 57 goes positive. That is, immediately upon a positive signal appearing at junction 57, the sense amplifier goes to saturation. Thus, the rounded pulses as represented at 56 are converted into more of a square wave shaped output.

The output of D.-C. amplifier 61 is still not sufficiently sharp in wave shape to properly operate the next stage, so a Schmitt trigger 65 is provided. The latter effects a substantially square wave signal output, it being responsive to a threshold signal to feed out a full output signal. Upon removal of the signal providing a threshold maintaining input, the output signal drops to "zero." Accordingly, the desired sharp pulse output for each pulse input is provided.

The output of the Schmitt trigger is fed into a flip-flop or multivibrator circuit 66, which is preferably of the type having one input connection that automatically directs the input signal to the proper portion of the multivibrator circuit to cause it to change stages. This type of flip-flop is known in the art as a "J-K flip-flop." A flip-flop circuit has two states, a "one" state and an opposite "zero" state. In operation, for example, if the flip-flop is in a "one" state a first signal input changes it to a "zero" state. A succeeding pulse signal input changes the flip-flop from the "zero" state back to the "one" state.

In the present instance a first pulse representative of radiation intensity pulse 32 changes the state of flip-flop 66 from the "one" state to the "zero" state. The next pulse representative of radiation intensity pulse 34 changes the flip-flop from the "zero" state back to the "one" state. The third pulse representative of radiation intensity pulse 33 again changes the flip-flop from the "one" state to the "zero" state. These pulses from the flip-flop 66 are fed into a gate 68 along with the unadulterated pulses received at junction 57 and fed into gate 68 along conductor 59. The function of gate 68 is to permit pulses representative of radiation intensity pulses 32 and 33 to pass through, while not permitting passage, that is suppressing, a pulse representative of the central radiation intensity pulse 34. As a result, a pair of pulses 69, 70 are produced at the output conductor 60. The pulses 69, 70 are representative of radiation intensity pulses 32, 33, which define the extremities of the diameter of the first, high intensity diffraction ring 30.

It is to be noted that after receiving a series of three pulses at its input, the flip-flop 66 is left in a state opposite to the state in which it began operation. Accordingly, a reset circuit 71 is provided operated by a push button 72 to return the flip-flop to its original state. This assures that when another aperture is positioned for analysis the readout circuit is ready to interpret the information.

It is now necessary to shape the pulses 69, 70 to turn "on" and turn "off" the multivibrator 40. To this end, the output conductor 60 transmits the pulses 69, 70 to a differentiator and current amplifier 74. The differentiator and current amplifier 74 has a positive signal output when there is no signal input to the circuit. However, an input to the circuit 74, such as pulses 69, 70, drives the differentiator and current amplifier negative. Accordingly, the output of the amplifier 74 is represented by the pulses at 75. A pulse signal 69a is representative of the differential of the pulse 69 and a pulse signal 70a is representative of the differential of the pulse 70. The latter pulses must be shaped to drive a subsequent flip-flop or multivibrator circuit. To this end, they are fed into a Schmitt trigger 76, the output of which drives a multivibrator or flip-flop 78. The latter operates in the same manner as the previously explained flip-flop 66.

The exemplary oscillator circuit 40 is an astable multivibrator circuit which has a selected pulse frequency. In one exemplary instance this frequency was selected to be 10,000 hertz. As represented at 79 a first pulse, representative of pulse 69, fed to flip-flop 78 changes the state of the latter from a "one" state to a "zero" state. This change initiates operation of the astable multivibrator 40. The next pulse input into flip-flop 78, representative of pulse 70, changes the flip-flop 78 back to the "one" state. As a result the multivibrator 40 is turned "off."

The astable multivibrator upon receiving a signal immediately goes into oscillation and produces a train of pulses as represented at 80 until the signal ceases to exist whereupon it stops oscillation. The train of pulses 80 is fed into an electronic counter 24 which can be adjusted so that the reading thereon is a direct function of the geometric characteristics of aperture 12.

The foregoing circuits, that is D.-C. amplifiers 51, 61, respectively, Schmitt triggers 65, 76, respectively, flip-flops 66, 78, respectively, gate 68, differentiator 74 and astable multivibrator 40 are not described in detail as each is commercially available in module form for installation in the readout circuit 23.

Though the diffraction pattern 19 exemplarily shown is for a circular aperture, other shaped apertures have distinctive far-field diffraction patterns, on which complete information can be collected to determine the size and shape of the unknown aperture.

Summarizing the steps of the present invention, the selected aperture 12 formed in a wall-like surface 11a is positioned in the path of a laser beam 15 with the wall-like surface 11a being disposed *perpendicular* so as to present the cross-section of the aperture 12 in a substantially perpendicular orientation to the axis 18 of the laser beam thereby establishing the far-field diffraction pattern 19. Next, the far-field diffraction pattern is mapped to identify a predetermined number of intensity points. Determination of the number of points required is dependent upon the amount of information that is to be derived about the aperture and upon the geometric configuration of the aperture. For example, for a circular aperture the diameter can be derived with acceptable accuracy by sensing two intensity points on the diffraction pattern. Finally, the mapped data is converted into a legible representation of the geometric characteristics of the aperture.

For a circular aperture it is simply necessary to determine the angle $\theta$ as previously defined and substitute sin $\theta$ into the formula:

$$\sin \theta = \frac{5.2\lambda}{2\pi a}$$

to obtain the diameter of the opening. For a structure of greater complexity such as a rectangle or a triangle, more intensity points must be mapped in order to describe the characteristics of the aperture under test with reasonable accuracy.

As herein described, the aperture 12 is formed in a wall 11a and the cross-section of the aperture, the geometric characteristics of which are desired, is aligned substantially perpendicular to the beam axis. As can be appreciated by those skilled in the art, the formation of the diffraction pattern is a critical wave interference phenomenon, and thus the alignment of the aperture is crucial.

While the invention has been described in connection with one specific embodiment and method, it is to be understood that this is by way of illustration and not by way of limitation. The scope of the invention is defined solely by the appended claims which should be construed as broadly as the prior art will permit.

I claim as my invention:

1. A system for measuring and displaying the diameter value of an aperture defined in a substantially opaque wall member, comprising:
    a mechanism for holding and indexing the wall member, which mechanism is adjustable to effect minute adjustments in the wall member position;
    means including a rotating mirror disposed at a predetermined distance beyond the aperture on one side of the wall member;
    means including a laser disposed on the other side of the wall member for providing a radiation beam, at least a portion of which is of substantially uniform intensity, and for directing the beam to impinge on said aperture and produce a far-field diffraction pattern represented by radiation intensity variations at the location of said rotating mirror;
    a radiation detector positioned to receive the radiation intensity variations reflected from said mirror and to produce an output signal which varies as a function of said radiation intensity variations, which output signal includes a center pulse portion and a pair of radiation intensity pulse portions, each of which is adjacent one side of the center pulse portion;
    circuit means for effectively suppressing said center pulse portion and for providing a value-indicating control signal having at least one parameter which varies as a function of the time delay between said adjacent pulse portions; and
    means, coupled to said circuit, for receiving said value-indicating control signal and for displaying a visible indication signifying the value of said aperture diameter.

2. A system for measuring and displaying the diameter value of an aperture defined in a substantially opaque wall member comprising:
    a mechanism for holding and indexing the wall member, which mechanism is adjustable to effect minute adjustments in the wall member position;
    means including a laser disposed on one side of the wall member for providing a radiation beam, at least a portion of which is of substantially uniform intensity, and for directing the beam to impinge on said aperture and produce a far-field diffraction pattern represented by radiation intensity variations;
    scanning means disposed at a predetermined distance beyond the aperture on the other side of the wall member including means for reflecting the radiation intensity variations of the far-field diffraction pattern;
    a radiation detector positioned to receive the radiation intensity variations reflected from said scanning means and to produce an output signal which varies as a function of said radiation intensity variations, which output signal includes a center pulse portion and a pair of radiation intensity pulse portions, each of which is adjacent one side of the center pulse portion;
    circuit means for effectively suppressing said center pulse portion and for providing a value-indicating control signal having at least one parameter which varies as a function of the time delay between said adjacent pulse portions; and
    means, coupled to said circuit means, for receiving said value-indicating control signal and for displaying a visible indication signifying the value of said aperture diameter.

References Cited

UNITED STATES PATENTS 3,064,519 11/1962 Shelton.
3,305,834 2/1967 Cooper et al.

OTHER REFERENCES

Sears, Francis W., Optics, Addison-Wesley Publishing Co., Inc., 3rd edition, April 1958, chapter 9 relied upon, particularly p. 255.

Bruce, C. F., "Measurement of Small Apertures by Interference and Diffraction," An article in Microtecnic, vol. XX, No. 2, April 1966, pp. 180–182.

RONALD L. WIBERT, Primary Examiner

T. MAJOR, Assistant Examiner